United States Patent [19]

Nugent

[11] Patent Number: 5,077,892

[45] Date of Patent: Jan. 7, 1992

[54] METHOD FOR THE MANUFACTURE OF STRUCTURALLY HOMOGENEOUS FLASH-FREE LEAD BATTERY TERMINALS

[76] Inventor: Robert R. Nugent, 285 Brickyard Rd., Manchester, Pa. 17345

[21] Appl. No.: 525,710

[22] Filed: Mar. 21, 1990

[51] Int. Cl.⁵ .............................................. H01R 43/16
[52] U.S. Cl. ................................... 29/874; 29/33 A; 439/801
[58] Field of Search ...... 29/823, 874, 33 A, DIG. 27, 29/DIG. 47; 439/801

[56] References Cited

U.S. PATENT DOCUMENTS

| | | |
|---|---|---|
| 2,170,811 | 8/1939 | Cornell . |
| 4,042,759 | 8/1977 | Cella ............................... 439/801 X |
| 4,079,235 | 3/1978 | Froyd et al. . |
| 4,166,311 | 9/1979 | Lindstrand ......................... 29/33 A |
| 4,301,581 | 11/1981 | Bader et al. . |
| 4,680,842 | 7/1987 | Moyer . |
| 4,776,197 | 10/1988 | Scott . |

FOREIGN PATENT DOCUMENTS 56-128572 10/1981 Japan ..................................... 29/874

Primary Examiner—Carl J. Arbes

[57] ABSTRACT

A method for the manufacture of structurally homogeneous flash-free lead battery terminals comprised of first removing all voids from the lead infeed stock by means of an extrusion forming process and then automatically delivering the void-free extrusion formed lead infeed stock to a computer-controlled automatic metal lathe for automated machining and delivery therefrom of a flash-free battery terminal output product.

7 Claims, 3 Drawing Sheets

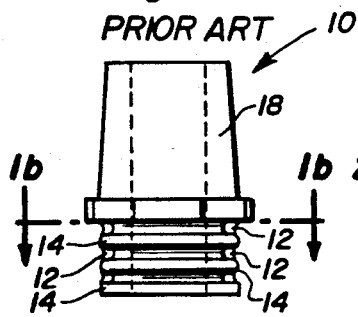
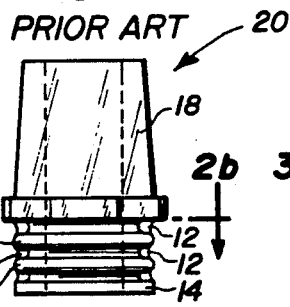
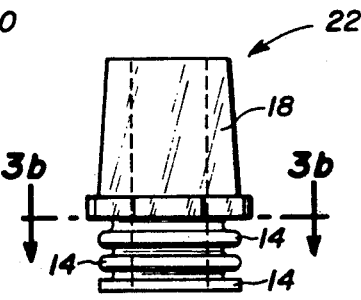
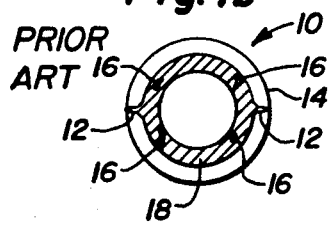
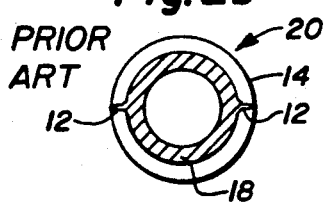
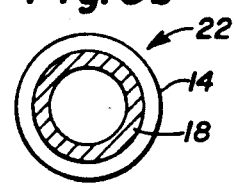
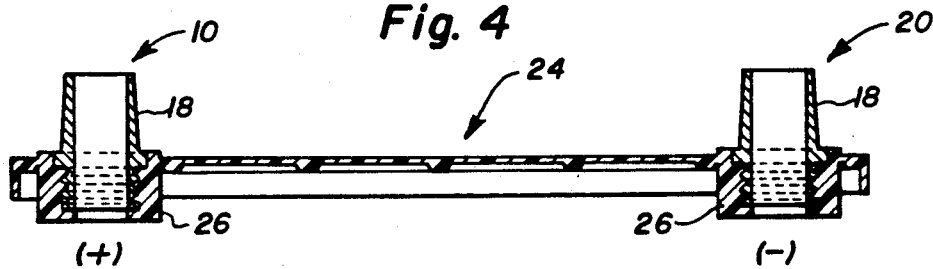
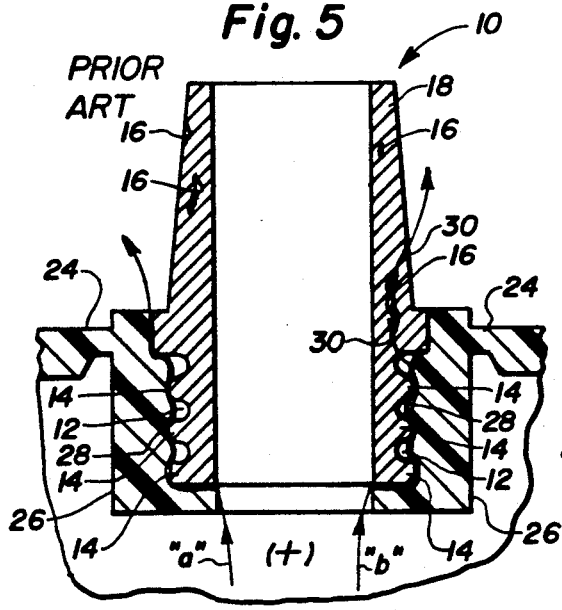
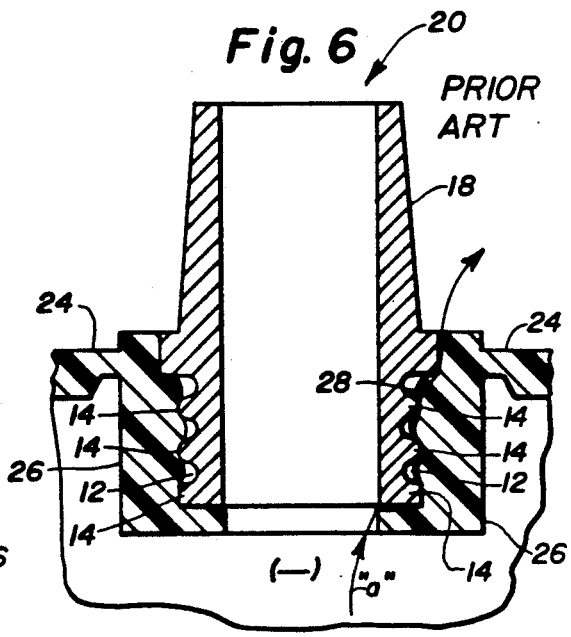

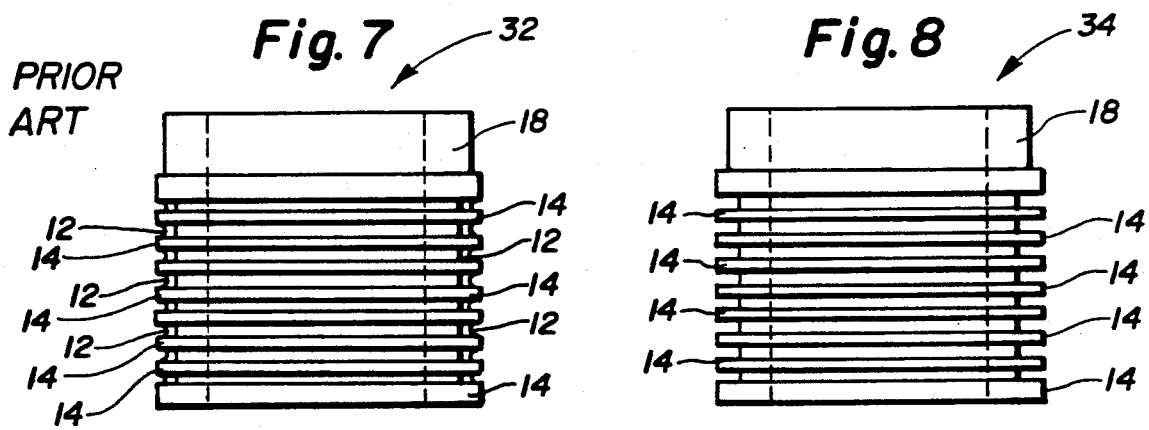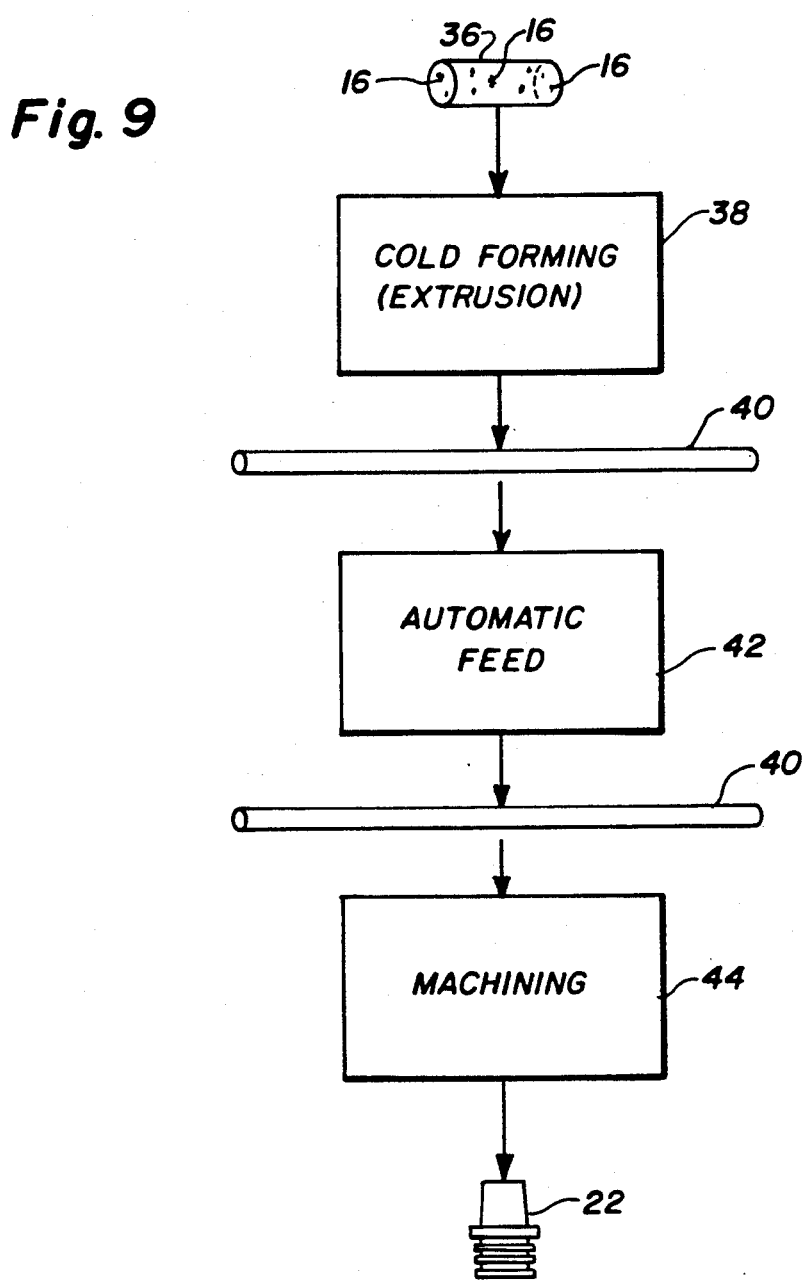

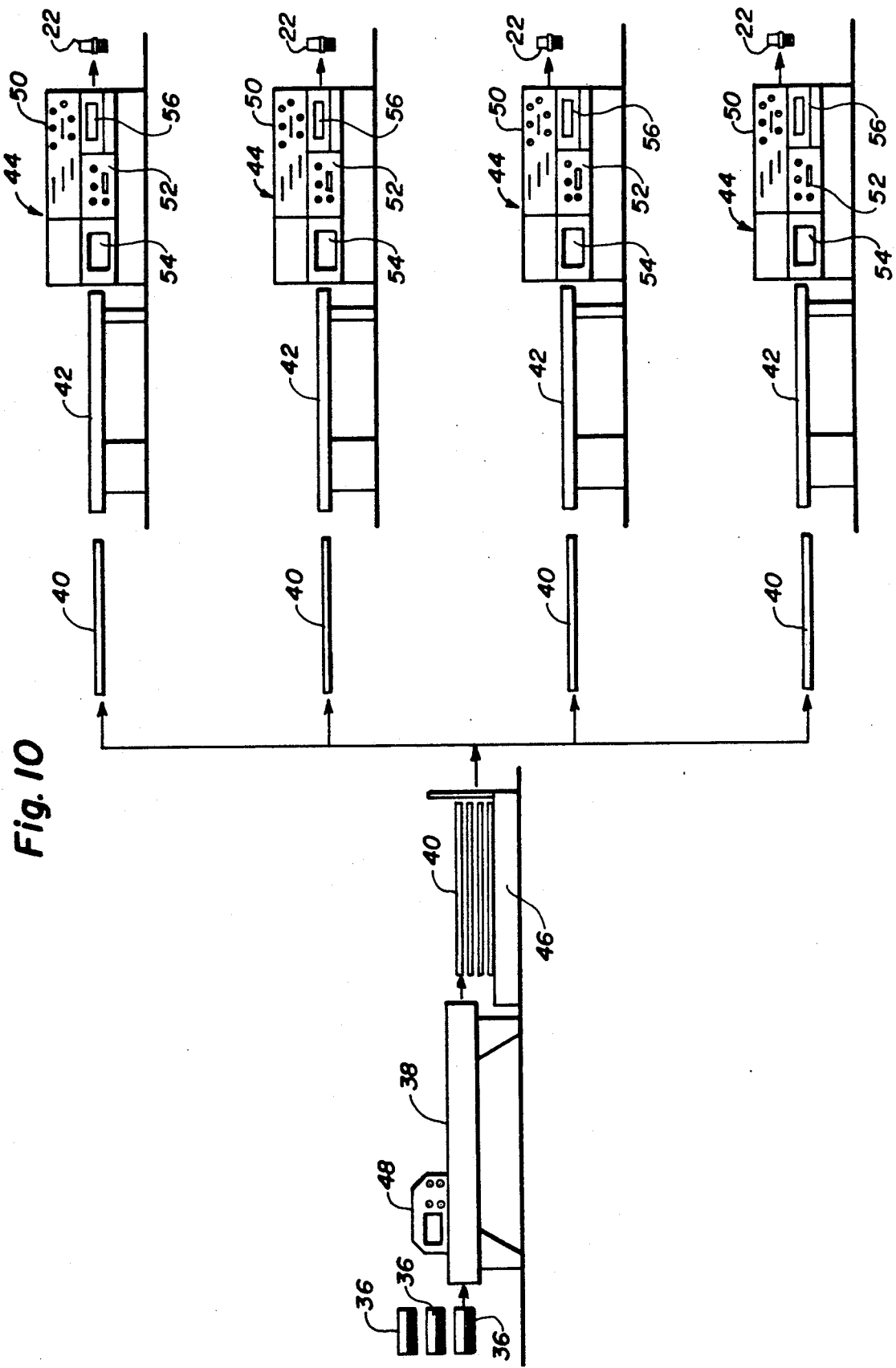

METHOD FOR THE MANUFACTURE OF STRUCTURALLY HOMOGENEOUS FLASH-FREE LEAD BATTERY TERMINALS

BACKGROUND OF THE INVENTION

The present invention relates to a method for the manufacture of structurally homogeneous flash-free lead battery terminals whereby the problems of battery failure due to electrolyte leakage from the battery either through the terminal itself due to cracks therein, or between the terminal and the battery case lid due to exterior terminal flashing which serves to function as a migratory leak channel through which the corrosive battery acid electrolyte can then escape, or battery leakage consequent from both such causes, are enabled to be substantially reduced or eliminated.

Lead is used as a battery terminal material for a number of reasons, among which are that it is a good electrical conductor, it is relatively cheap, generally corrosion resistant, and with proper precautions to avoid lead poisoning it is safe to handle. Lead is not, however, a particularly good material for use in a mechanical flexure-stress environment, and when a vibratory flexure-stress environment such as in a vehicular battery use application in an automobile or truck, boat, or airplane is combined with the corrosive battery acid electrolyte environment, lead battery terminals become more susceptible to mechanical failure.

Traditionally, lead battery terminals have been cast from the molten metal or alloys thereof, by methods and techniques long known and well established in the art. This method of lead battery terminal manufacture continues in widespread use, but produces a product which contains internal voids consequent from air entrainment during the casting process, as well as external seam flashing along the junctures of separable mold joining. In subsequent mechanical incorporation and use as battery terminal posts within the typical lead-acid storage battery cover or casing both the internal air pocket voids and the external seam flashing of the cast terminal, under the vibratory conditions in a typical vehicular use situation, when combined with the corrosive battery acid electrolyte environment, provide those defects known to be the most prevalent of causes in battery acid leakage due to terminal failure, either by way of vibratory corrosive cracking migration from the air entrained voids, or vibratory corrosive failure of the flashing web between the terminal-to-case joining.

A second way of manufacturing battery terminals is by the so-called cold forming method, where a cast lead billet or rod is cut to slug length and then fed to a hydraulic press where the terminal is formed in separable dies under pressure. This method does compact the lead to such an extent that all internal air pocket voids are eliminated, but under press pressure upon a slug within the separable forming dies, and with any appreciable die wear at all, an external flashing web will still be formed along the junctures of separable mold joining, with the subsequent problems attendant thereto as previously described with respect to battery terminal leakage failure of the flashing web between the terminal-to-case joining when subjected to a vibratory corrosive use environment.

With respect to both of the prior art methods of manufacturing lead battery terminals, whether by casting or cold forming, the cost of removing the external flashing web formed at the separable mold juncture lines when compared to the risks of subsequent battery leakage as is frequently consequent therefrom, in most use environments, is not considered to be either practical or economically feasible and lead battery terminals continue to be manufactured in one of the two foregoing ways.

In some liquid electrolyte battery applications, however, for example as is the case when such batteries are employed for back-up emergency power sources on nuclear submarines, and where the batteries are frequently positioned on their sides and located at remote and relatively inaccessible places within the ship, then any corrosive liquid leakage from such a battery would be unacceptable. In applications such as the foregoing, and in applications in general to provide battery terminals which do not have either the entrained air void or external flash defects, the present invention does provide a cost effective solution for overcoming these problems through a method of manufacturing structurally homogeneous flash-free lead battery terminals by the combined process of extrusion and automated machining. Although the mechanical elements of the present invention for accomplishment of the method herein taught are separately available as conventional machine centers for accomplishing various manufacturing operations, there is no known showing of the sequential combination of those particular machine elements or alternatives therefor, as herein taught, to provide both a new and novel result in the manufacture of structurally homogeneous flash-free lead battery terminals in the manner as hereinafter set forth.

SUMMARY OF THE INVENTION

It is the principal object of the present invention to provide a method for the manufacture of structurally homogeneous flash-free lead battery terminals.

It is another object of the present invention to provide a method for the manufacture of structurally homogeneous flash-free lead battery terminals which delivers with a comparable machine complex a production output at least equivalent to if not in excess of those production outputs typically achieved by either the hot-casting or cold-forming methods of manufacturing lead battery terminals.

It is also an object of the present invention to provide a method for the manufacture of structurally homogeneous flash-free lead battery terminals which substantially reduces the direct labor requirements and costs for both production machine manning and material handling operations.

It is a further object of the present invention to provide a method for the manufacture of structurally homogeneous flash-free lead battery terminals which delivers a production output battery terminal product of both a higher visual and mechanical quality than those delivered as production output battery terminal product from either the hot-casting or cold-forming methods of manufacturing lead battery terminals.

A further object of the present invention is to provide a method for the manufacture of structurally homogeneous flash-free lead battery terminals which produces a structurally homogeneous flash-free lead battery terminal as the delivered production output product without any need or necessity for subsequent handling or operational steps in achieving either the void-free structure or flash-free terminal profile.

Yet another object of the present invention is to provide a method for the manufacture of structurally homogeneous flash-free lead battery terminals which delivers an output battery terminal product that will not have porosity inclusions to function as either electrical current flow insulators or migration points from which structural failure fissures may emanate and develop into external cracks leading to battery fluid leakage and either terminal or battery failure.

Still another object of the present invention is to provide a method for the manufacture of structurally homogeneous flash-free lead battery terminals which delivers an output battery terminal product with a clean sharp and mechanically well defined lug structure so that when the terminal is set and sealed into a battery case there will be no mechanical interruption in the fit therebetween to result in battery fluid leakage about the terminal lug-to-case seal.

The foregoing, and other objects hereof, will be readily evident upon a study of the following specification and accompanying drawings comprising a part thereof.

BRIEF DESCRIPTION OF THE DRAWINGS

FIG. 1a is a side elevation view of a typical prior art cast lead battery terminal.

FIG. 1b is a top sectional view of the typical prior art cast lead battery terminal as shown in FIG. 1a and seen along the line 1b—1b thereof.

FIG. 2a is a side elevation view of a typical prior art cold formed lead battery terminal.

FIG. 2b is a top sectional view of the typical prior art cold formed lead battery terminal as shown in FIG. 2a and seen along the line 2b—2b thereof.

FIG. 3a is a side elevation view of a typical lead battery terminal manufactured in accordance with the method as taught by the present invention.

FIG. 3b is a top sectional view of the typical lead battery terminal manufactured in accordance with the method taught by the present invention as shown in FIG. 3a and seen along the line 3b—3b thereof.

FIG. 4 is a side sectional elevation view of a typical lead-acid storage battery cover and the installation therein of a set of typical lead battery terminals as previously illustrated.

FIG. 5 is an enlarged side sectional elevation view of a typical prior art cast lead battery terminal illustrating the typical mechanisms of leakage failure thereof when installed in a typical lead-acid storage battery cover.

FIG. 6 is an enlarged side sectional elevation view of a typical prior art cold formed lead battery terminal illustrating the typical mechanism of leakage failure thereof when installed in a typical lead-acid storage battery cover.

FIG. 7 is a side elevation view of a typical prior art cold formed heavy-duty lead battery terminal.

FIG. 8 is a side elevation view of a typical heavy-duty lead battery terminal manufactured in accordance with the method as taught by the present invention.

FIG. 9 is a simplified process flow sheet sequentially illustrating the steps of lead battery terminal manufacture in accordance with the method taught by the present invention.

FIG. 10 is a simplified machine lay out sequentially illustrating the mechanical steps of lead battery terminal manufacture in accordance with the method as taught by the present invention.

DETAILED DESCRIPTION OF THE INVENTION

Considering initially the structural defect characteristics generally indicative of those lead battery terminal products currently being produced by other methods as compared to the output product delivered by the method hereof for the manufacture of structurally homogeneous flash-free lead battery terminals, I direct attention first to the cast lead battery terminal shown in FIGS. 1a and 1b.

FIGS. 1a and 1b respectively show a side elevation view and top sectional view therethrough of a typical prior art cast lead battery terminal 10, and in particular show the flashing webs 12 which are formed between the terminal retaining lugs 14 along the trace of the separable mold junctures during the casting operation, as well as the internal air pocket voids 16 consequent from air entrainment within the lead alloy material 18 from which the terminal 10 is cast, which defects typically happen during the casting operation due to such factors as mold die wear, casting speed, operator skill, and operational temperatures of both the molten lead alloy material and the mold dies. As was earlier described generally, and will hereinafter be pointed out in detail, both the flashing web 12 and internal air pocket void 16 defects create potential failure sites for battery liquid leakage in the subsequent rigors of typical vehicular use environment employment.

Considering next the views shown in FIGS. 2a and 2b, there is shown respectively side elevation and top sectional views of a typical prior art cold formed lead battery terminal 20, which is characteristic of the output product delivered from the second of methods generally employed for manufacturing lead battery terminals, that of cold forming by use of a hydraulic press and a separable die system. As a consequence of the high hydraulic pressures exerted upon a lead slug positioned within the separable die when forming a battery terminal, any internal voids due to entrained air within the slug are compressed so that the terminal body 20 is thus comprised of a homogeneous void-free lead mass as respectively shown in FIGS. 2a and 2b. However, the cold forming process does not eliminate the flashing web 12 problem since the flashing web forms within the separable mold juncture seams as the lead slug is compressively forced into a battery terminal configuration within the separable mold dies. In the cold forming method of manufacture, since wear on the separable mold die under rigors of pressure forming can in fact be greater, the flashing web 12 formation problem is normally as great if not greater than that encountered in the previously discussed casting method, again with the attendant creation of potential failure sites for battery liquid leakage in the subsequent rigors of typical vehicular use environment employment.

Referring now to FIGS. 3a and 3b, where is shown a side elevation and top sectional view respectively of a typical structurally homogeneous flash-free lead battery terminal 22 manufactured by the method of instant invention, wherein it is seen that the terminal 22 is absent both internal air pocket voids as well as having no flashing web. As a result of the lack of such defects as aforesaid, the terminal 22 being thus improved, is not susceptible to the potential battery liquid leakage failures as are those manufactured by either the casting or cold forming processes. Although the details of the method for manufacturing structurally homogeneous flash-free lead battery terminals 22 will be hereinafter described in detail, following a discussion of the specific mechanisms of battery terminal liquid leakage failure due to either a flashing web 12 or internal air pocket void 16 defect, suffice it to say at this point that a combined technique of first cold forming the battery terminal infeed stock by a process of extrusion to eliminate any internal air pocket voids followed secondly by an automated machining process to eliminate the mechanisms whereby flashing webs are formed along the terminal retaining lugs 14 comprises the basic methodology for producing battery terminals 22.

Turning now to FIG. 4, there is shown a side sectional elevation view of a typical lead-acid storage battery cover 24 showing therein installed an exemplary set of typical lead battery terminals to function as the positive and negative poles, which for purposes of further discussion on the mechanisms of battery terminal liquid leakage failure are respectively denominated as a cast lead battery terminal 10 and a cold formed lead battery terminal 20, although it is to be understood that in actual practice in the use employment of such terminals both would normally be of the same type. Typically a battery cover 24 will be formed from a satisfactory high impact plastic material, and be provided with a set of terminal bosses 26 which are adapted to receive and seal the retaining lugs 14 of the respective terminals 10 and 20 therewithin thereby securing the positive and negative poles.

The view shown in FIG. 5 is a fragmentary side sectional elevation of a portion of the battery cover 24 previously shown in FIG. 4, more particularly therein detailing the installation of the typical prior art cast lead battery terminal 10 in the terminal boss 26 therefor and further illustrating the typical mechanisms of battery terminal liquid leakage failure consequent from terminals having flashing web 12 and internal air pocket void 16 defects.

Considering first the flashing web 12 defect, liquid leakage failure of a typical prior art cast lead battery terminal 10 is shown in FIG. 5, wherein the arrow "a" indicates the path of liquid electrolyte substance escape by way of a flashing web 12 defect failure. As can be seen, the flashing web 12 extends into and is embedded within the terminal boss 26 of the battery cover 24. Battery installation and employment in a typical vehicular use application, involving mechanical vibration and stress force exertion upon the terminal 10 causes flexure and movement of the flashing web 12 with a consequent damaging thereof and a resultant loosening of the terminal retaining lugs 14 within the terminal boss 26 which thereby in turn results in the creation of an electrolytic liquid leak channel 28 providing a path for liquid electrolyte substance escape as indicated by arrow "a" in FIG. 5.

The internal air pocket void 16 defect liquid leakage failure of a typical prior art cast lead battery terminal 10 is also shown in FIG. 5, wherein the arrow "b" indicates the path of liquid electrolyte substance escape by way of an internal air pocket void 16 defect failure. As can be seen in this case, an electrolytic liquid leak channel 28 connects with an internal air pocket void 16 defect by means of a communicating stress crack 30 which passes through the internal air pocket void 16 weakened site and extends upwardly to the outer terminal surface, all of which provides a path for liquid electrolyte substance escape as indicated by arrow "b" in FIG. 5.

The view shown in FIG. 6 is a fragmentary enlarged side sectional elevation of a portion of the battery cover 24 as previously shown in FIG. 4, more particularly therein detailing installation of the typical prior art cold formed lead battery terminal 20 in the terminal boss 26 therefor and further illustrating the typical mechanism of battery terminal liquid leakage failure consequent from the terminal having a flashing web 12 defect. Again, the arrow "a" indicates the path of liquid electrolyte substance escape through an electrolytic liquid leak channel 28 created by way of a flashing web 12 defect failure.

As previously described and as can also be herein seen, the flashing web 12 extends into and is embedded within the terminal boss 26 of the battery cover 24. Battery installation and employment in a typical vehicular use application, involving mechanical vibration and stress force exertion upon the terminal 20, causes flexure and movement of the flashing web 12 with a consequent damaging thereof and a resultant loosening of the terminal retaining lugs 14 within the terminal boss 26 which thereby in turn results in the creation of an electrolytic liquid leak channel 28 providing a path for liquid electrolyte substance escape as indicated by arrow "a" in FIG. 6.

In both of the foregoing examples, the battery terminal defect which may result in subsequent electrolytic liquid leakage, whether it be the flashing web 12 or the internal air pocket void 16 defect, as previously explained is an inherent consequence of either the casting or cold forming methods of manufacture. And as also previously explained, particularly in the case of the flashing web 12 defect which results in both the casting and cold forming methods of manufacture, the cost of removing the external flashing web formed at the separable mold juncture lines when compared to the risks of subsequent battery leakage as is frequently consequent therefrom, in most use environments, is not considered to be either practical or economically feasible and lead battery terminals continue to be manufactured in one of the two foregoing ways.

Considering together now FIGS. 7 and 8, there is shown in FIG. 7 a side elevation of a typical prior art cold formed heavy-duty lead battery terminal 32, and in FIG. 8 a corresponding side elevation of a structurally homogeneous flash-free heavy-duty lead battery terminal 34 manufactured in accordance with the method as taught by the present invention. As had been previously herein pointed out, there are certain liquid electrolyte battery applications where liquid leakage therefrom due to terminal defects would simply not be acceptable, as would be the case where such batteries are employed for back-up emergency power sources on nuclear submarines.

It will be noted that the heavy duty lead battery terminals 32 and 34 are not only larger in relative physical size but are provided with a substantially greater number of terminal retaining lugs 14. The larger physical size is to handle a higher density of current flow, whereas the increased number of terminal retaining lugs is to provide a greater number and depth of interlocked sealing sites within the terminal boss of the battery cover in order to reduce substantially the likelihood of liquid leakage due to terminal defect failure. Also, since it is not uncommon that batteries in the instant use application be positioned on their sides, the cause for concern with regard to liquid leakage from terminal defect failure is even more immediate.

As shown in FIG. 7, as is characteristic with cold formed lead battery terminals, there are present the flashing webs 12 which form, as earlier explained in detail, along the junctures of the separable mold die when the slug in manufacturing is placed under hydraulic pressure for forming the terminal. Again, when these flashing webs 12 are subjected to the use environment mechanical stresses of vibration and the corrosive environment of battery acid electrolyte, they also are subject to causing terminal defect failure by forming an electrolytic liquid leak channel as previously explained. Absent the flashing webs, however, as in the case of the structurally homogeneous flash-free heavy-duty lead battery terminal 34 as shown in FIG. 8, manufactured in accordance with the method as taught by the present invention, there are no such defects to cause terminal failure by way of vibratory-corrosion erosive formation of an electrolytic liquid leak channel.

Considering now FIG. 9, a simplified process flow sheet is shown sequentially illustrating the steps of structurally homogeneous flash-free lead battery terminal manufacture in accordance with the method as taught by the present invention. In this method the first step is to produce a battery terminal infeed stock material that is free of internal air pocket void 16 defects, that is, structurally homogeneous, and configured in the appropriate physical and dimensional profiles for automated infeed through and to subsequent machine centers.

Initially a lead billet 36 of an alloy material of suitable composition for the particular battery terminal application in which it is to be employed, itself containing internal air pocket voids 16, is processed through a cold forming machine 38 and reformed by extrusion to a structurally homogeneous battery terminal infeed stock material 40 which is free of internal air pocket void defects and dimensionally profiled for automated infeed through an automatic infeed stock material feeder 42 to an automated computer-controlled machining center 44 from which is automatically delivered the structurally homogeneous flash-free lead battery terminal 22 product.

It should be noted, that although the method herein recited incorporates a cold forming extrusion process for providing a structurally homogeneous battery terminal infeed stock material 40, free of any internal air pocket voids, it is possible that the infeed stock material 40 may well be separately produced and furnished from another source.

Turning now to a consideration of FIG. 10, there is shown a simplified machine lay out sequentially illustrating the steps of manufacture for producing the structurally homogeneous flash-free lead battery terminal product in accordance with that method as taught by the present invention, wherein it is to be understood both the numbers and types of machines shown are to be considered typical and exemplary only and not per se restrictive, and depending on various factors such as machine output capabilities, product mix, shift requirements and the like, different numbers of machines may be employed to carry out and accomplish the method. Generally, however, there would be a single cold forming machine 38 which would be capable of extruding on a multiple shift basis sufficient structurally homogeneous battery terminal infeed stock material 40 to supply a plurality of automated computer-controlled machining centers 44 on a single shift basis, in the exemplary illustration of FIG. 10 there being four in number, and for each such automated computer-controlled machining center 44 there would be an associated automatic infeed stock material feeder 42.

Considering FIG. 10 again, but now in terms of that machinery employed for accomplishing specific process steps at each stage of the sequential method of the present invention, the first machine and step accomplished thereby is to convert lead billets 36 into battery terminal infeed stock material of uniform cross-sectional composition, which is provided by a cold forming machine 38 to extrude lead billets 36 infed thereto and thereby remove all internal air pocket voids therefrom by compressing and reforming said billets 36 and deliver either a rod or tube of structurally homogeneous battery terminal infeed stock material 40 which is also dimensionally profiled for the particular terminal 22 to be made as well as handling and processing through subsequent machining operations. The cold forming machine 38 is normally provided with an accumulator 46 which receives and stacks the extruded stock material 40 for convenient handling and subsequent processing or storage transfer, in addition to having automatic extrusion die controls 48 for expedited cold forming machine 38 set-up and maintenance of machine set during operational running.

Under typical operational circumstances in practice of the method of the present invention, the cold forming machine 38 delivered structurally homogeneous battery terminal infeed stock material 40 would be removed from the accumulator 46, broken down as shown, and staged for infeed delivery to the plurality of automatic infeed stock material feeders 42. It could be, however, that the structurally homogeneous battery terminal infeed stock material 40 staged for infeed delivery to the plurality of automatic infeed stock material feeders 42, as shown in FIG. 10, was either furnished from storage or provided from a separate manufacturing source or vendor of structurally homogeneous battery terminal infeed stock material 40 made to the specifications of uniform cross-sectional composition and free of internal air pocket voids.

The function of the automatic infeed stock material feeders 42 is to provide a continuous and controlled structurally homogeneous battery terminal infeed stock material 40 delivery respectively to each of the automated computer-controlled machinery centers 44, which in turn operates to reduce manning requirements and provide optimum operational output respectively therefrom.

The automated computer-controlled machining center 44 is comprised of a computer-controlled automatic metal lathe 50 which is adjusted and operationally set-up by means of a computer 52 and a make-ready viewing screen 54, the machining center functional output and product of which is randomly checked by means of a run moniter 56. As the structurally homogeneous battery terminal infeed stock material 40 is delivered by means of the automatic infeed stock material feeder 42 and incrementally received by the automated computer-controlled machining center 44, a slug is automatically cut therefrom and secured by the computer-controlled automatic metal lathe for automated computer-controlled machining therefrom of a structurally homogeneous flash-free lead battery terminal 22. Since the terminal 22 is manufactured from structurally homogeneous battery terminal infeed stock material 40 there are no entrained internal air pocket voids contained therein, and since the terminal 22 is machined on a lathe rather than being cast or cold formed within a separable mold die there are no flashing webs. Thus, two of the primary mechanical defects for cause of battery terminal liquid leakage failure, as a consequence of the method of manufacture herein taught, are not inherently integrated into the end use battery terminal product. Also, by use of the run moniter 56 capability of the automated computer-controlled machining center 44, the terminal 22 output product can be continually checked for conformance with manufacturing tolerance specifications and automated computer-controlled run adjustments made to maintain the same.

It should be again emphasized, that although the method of the present invention has been illustrated and described in terms of the preferred machine components for the accomplishment thereof, it is acknowledged and recognized, depending on the particular production requirements and output product profile, that other equally suitable and standardly available machine components may also be just as satisfactorily employed, and that the machine components shown herein are represented as being typical and are exemplary only and not necessarily restrictive of the only types with which said method may be beneficially practiced or accomplished. Accordingly, although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent methods accomplished with similar machine components, and it is to be understood that such variations may be made within the scope of the appended claims.

I claim:

1. A method for the manufacture of structurally homogeneous flash-free lead battery terminals, comprising the steps of extruding a lead alloy billet by means of a cold forming machine to produce an elongated piece of structurally homogeneous battery terminal infeed stock material free of internal air pocket voids, delivering said elongated piece of structurally homogeneous battery terminal infeed stock material to an automatic infeed stock material feeder for re-delivery incrementally therefrom into an automated computer-controlled machining center for cutting of a slug thereby from said elongated piece of structurally homogeneous battery terminal infeed stock material, and automated computer-controlled machining of said slug into a structurally homogeneous flash-free lead battery terminal.

2. A method for the manufacture of structurally homogeneous flash-free lead battery terminals according to claim 1, wherein the elongated piece of structurally homogeneous battery terminal infeed stock material produced by extrusion of said lead alloy billet is in the form of a rod.

3. A method for the manufacture of structurally homogeneous flash-free lead battery terminals according to claim 1, wherein the elongated piece of structurally homogeneous battery terminal infeed stock material produced by extrusion of said lead alloy billet is in the form of a tube.

4. A method for the manufacture of structurally homogeneous flash-free lead battery terminals, comprising the steps of delivering an elongated piece of structurally homogeneous battery terminal infeed stock material free of internal air pocket voids to an automatic infeed stock material feeder for re-delivery incrementally therefrom into an automated computer-controlled machining center for cutting of a slug thereby from said elongated piece of structurally homogeneous battery terminal infeed stock material, and automated computer-controlled machining of said slug into a structurally homogeneous flash-free lead battery terminal.

5. A method of manufacturing structurally homogeneous flash-free lead battery terminals, comprising the steps of extruding a lead alloy billet by compressing and reforming the billet in a cold forming machine to produce an elongated piece of structurally homogeneous battery terminal infeed stock material free of internal air pocket voids, cutting a slug from the piece of structurally homogeneous battery terminal infeed stock material, securing the slug to a lathe, and machining the slug with the lathe to form a structurally homogeneous flash-free lead battery terminal.

6. The method of claim 5, the elongated piece of structurally homogeneous battery terminal infeed stock material being a rod.

7. The method of claim 5, the elongated piece of structurally homogeneous battery terminal infeed stock material being a tube.

* * * * *